US008046416B2

(12) United States Patent
Biasi et al.

(10) Patent No.: US 8,046,416 B2
(45) Date of Patent: Oct. 25, 2011

(54) SYSTEM AND METHODS TO DETERMINE A RECIPIENT FOR AMBIGUOUSLY ADDRESSED MAIL

(75) Inventors: Theresa Biasi, Shelton, CT (US); Bradley R. Hammell, Bridgeport, CT (US); Darryl T. Rathbun, Stratford, CT (US); Trysh Wahlig, Chicago, IL (US); G. Jonathan Wolfman, Brattleboro, VT (US)

(73) Assignee: Pitney Bowes Inc., Stamford, CT (US)

( * ) Notice: Subject to any disclaimer, the term of this patent is extended or adjusted under 35 U.S.C. 154(b) by 783 days.

(21) Appl. No.: 11/955,532

(22) Filed: Dec. 13, 2007

(65) Prior Publication Data

US 2009/0157821 A1 Jun. 18, 2009

(51) Int. Cl.
*G06F 15/16* (2006.01)

(52) U.S. Cl. ......... 709/206; 709/200; 709/204; 209/584

(58) Field of Classification Search ................... 709/206
See application file for complete search history.

(56) References Cited

U.S. PATENT DOCUMENTS

| | | | | |
|---|---|---|---|---|
| 7,233,929 | B1 * | 6/2007 | Lingle et al. | 705/402 |
| 2002/0029202 | A1 * | 3/2002 | Lopez | 705/406 |
| 2002/0046196 | A1 * | 4/2002 | Ogg | 705/406 |
| 2002/0082935 | A1 * | 6/2002 | Moore et al. | 705/26 |
| 2004/0065598 | A1 * | 4/2004 | Ross et al. | 209/584 |
| 2005/0137991 | A1 * | 6/2005 | Bruce et al. | 705/410 |

* cited by examiner

*Primary Examiner* — Wing Chan
*Assistant Examiner* — Andrew Woo
(74) *Attorney, Agent, or Firm* — Brian A. Lemm; Charles R. Malandra, Jr.; Steven J. Shapiro

(57) ABSTRACT

According to some embodiments a system and a method are provided to determine a correct mail recipient are disclosed. The method comprises receiving an incorrectly addressed mail piece from a sender, scanning the mail piece, analyzing the scanned mail piece to produce analysis results, determining a correct address for the mail piece based at least in part on the analysis results, printing a correctly addressed label based on the determination, adhering the correctly addressed label to the mail piece, sending the mail piece comprising the correctly addressed label to a mail recipient, and transmitting a notification of the correct address to the sender.

13 Claims, 4 Drawing Sheets

SYSTEM AND METHODS TO DETERMINE A RECIPIENT FOR AMBIGUOUSLY ADDRESSED MAIL

BACKGROUND

Many companies must deal with some portion of their incoming mail that is ambiguously or incorrectly addressed. Currently, it takes a significant amount of knowledgeable manpower to determine who is the individual who is the intended recipient for each piece of incorrectly addressed mail. There are several problems with the current method because it takes a significant amount of time to route the incorrectly addressed mail and if an amount of manpower is limited or not available; more time may be expended by teaching replacement personnel. Although the replacement personnel eventually learn how to recognize many mail pieces, they must endure a long process to determine the recipients for other mail pieces on a recurring basis. Even for the mail pieces that are easily identified, significant time is used to write an internal address for each mail piece. In some cases, this incorrectly addressed mail may be return mail or business reply mail that was generated by an internal department using an ambiguous return address.

Since mail of this kind is considered "deliverable" by United States Postal Service ("USPS") standards, the mail originator is unaware that the mail is being delayed before delivery or in some cases discarded if employees have left the recipient company. In addition, since the USPS National Change of Address ("NCOA") database does not include any information about individuals within companies, the originator has no easy way to correct the address or even identify if the recipient still works at the address. Since there is no easy way for a receiving mailroom to inform the mail originator of the correct address, the problem perpetuates and the internal address may have to be re-researched every time a new mail piece arrives from the same mail originator.

SUMMARY

A system and a method of determining a correct mail recipient are disclosed. The method comprises receiving an incorrectly addressed mail piece from a sender, scanning the mail piece, analyzing the scanned mail piece to produce analysis results, determining a correct address for the mail piece based at least in part on the analysis results, printing a correctly addressed label based on the determination, adhering the correctly addressed label to the mail piece, sending the mail piece comprising the correctly addressed label to a mail recipient, and transmitting a notification of the correct address to the sender.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, descriptions, and claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Figure 1:
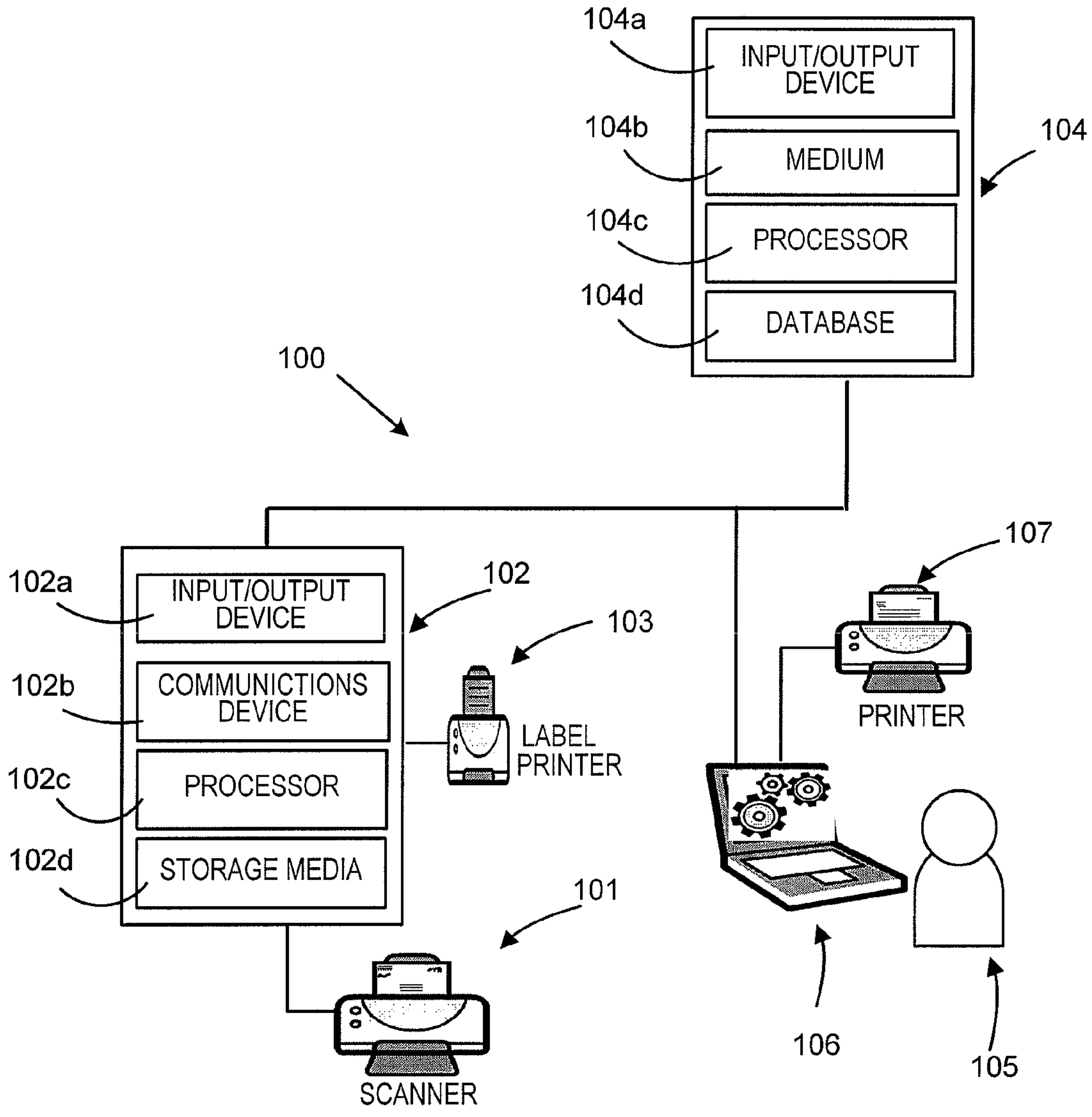
FIG. 1 illustrates a system according to some embodiments.

Now referring to FIG. 1, an embodiment of a system 100 is illustrated. System 100 may comprise a scanner 101, a first computer 102, a first printer 103, an expert system 104, a clerk 105, a second computer 106, and a second printer 107. The scanner 101 may be any scanner 101 that is, or becomes known and the scanner may capture an image of a face of the mail piece, the back of the envelope, and/or contents of the envelope. In some embodiments, the scanner 101 may comprise a bright light source to inspect the contents of the mail piece without opening the mail piece. In some embodiments, the scanner 101 may comprise a magnetic ink sensor for determining if the contents include a check or currency, which may require a higher processing priority.

The scanner 101 may be in communication with the first computer 102. The first computer 102 may run an optical character recognition ("OCR") program that reads an address and a return address of a mail piece based on an image captured by the scanner 101 and transmitted by the scanner 101 to the first computer 102. The OCR program may be used in conjunction with a name variation parsing program and a name database which, in some embodiments, are also included in the first computer 102. In many cases, the address may contain some variation of an employee's name or a department name associated with an incorrect or missing internal mail code. For these cases, the OCR program may translate the address into text, the parsing program may extract the addressee name, and the name may be compared to a plurality of names stored in the name database using rules associated with the name variation parsing program. For example, the rules may discover personal name variations such as Elizabeth that could be Liz, Beth, Betty, Lizzy, etc., department variations such as TechCentral that could be IT, or Data Processing, locally known aliases such as Zhibang Chen who may be known as Steven Chen, or maiden names such as Cheryl Smith whose married name may be Cheryl Klein.

The first computer 102 and the second computer 106 may comprise, but are not limited to, laptops, desktop, or servers. Each computer 102/106 may comprise a plurality of memory, an input/output device 102*a*, a communications device 102*b*, one or more processors 102*c*, and storage media 102*d*. The first computer 102 may provide an interface for the scanner 101 and the first printer 103 to communicate with the expert system 104. The second computer 106 may provide an interface for the clerk 105 to access the expert system 104 and to provide an interface for the second printer 107 to communicate with the expert system 104. In some embodiments, a single computer may be used to replace the first computer 102 and the second computer 106.

In some embodiments, the first printer 103 may be a label printer and the second printer 107 may print card sized mail pieces. In some embodiments, the first printer 103 may print the recipient's name and internal mail code directly on the mail piece or on a label and the second printer 107 may print address correction cards.

The expert system 104 may comprise an input/output device 104*a*, one or more processors 104*c*, memory (not shown), and a database 104*d*. The expert system may further comprise a computer readable medium 104*b* for storing instructions to be executed by the one or more processors. When executed, the instructions may retrieve at least one of the plurality of envelope characteristics from the database and match the one or more of a plurality of envelope characteristics to one of a plurality of mail recipients and in some embodiments the instructions may match one or more of a plurality of content characteristics to one of a plurality of mail recipients as described below. The expert system 104 may further include a name variation parsing program as described previously. The database 104*d* may comprise employee and department names, as well as image recognition characteristics and patterns. In some embodiments, the database 104*d* may comprise one or more databases. In some embodiments, the expert system may exist on a stand-alone computer system or may be part of the first computer 102 or the second computer 106.

The clerk 105 may be considered a last resort when the system 100 cannot determine a correct mail recipient. The clerk 105 may manually determine a mail recipient and enter the information into the expert system 104. In some embodiments, the clerk 105 may open the mail piece and manually scan the contents of the mail piece.

Figure 2:
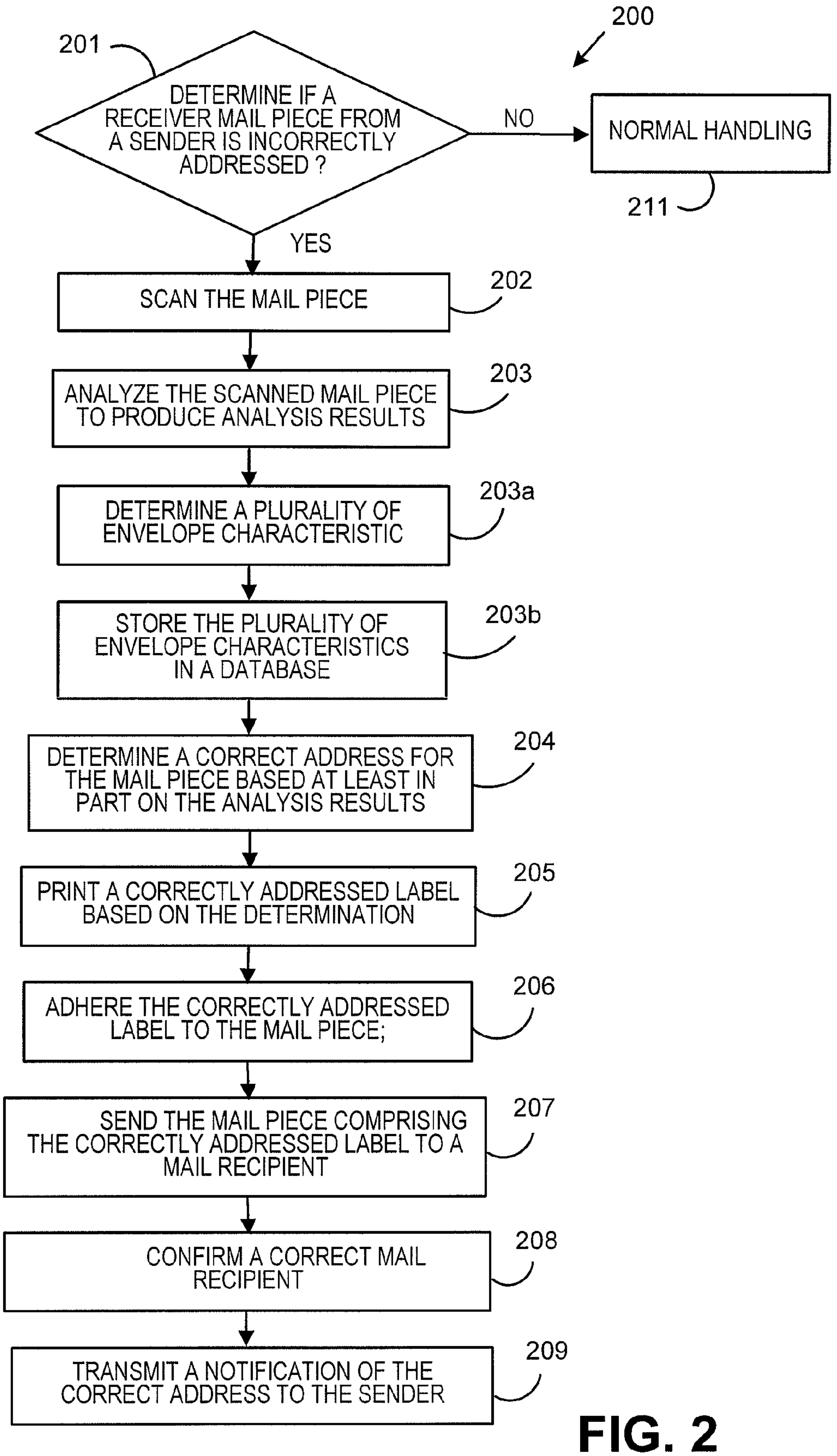
FIG. 2 illustrates a method according to some embodiments.

Now referring to FIG. 2, an embodiment of method 200 is illustrated. Method 200 may be performed by any system, such as, but not limited to the system described with respect to FIG. 1. At 201, a determination is made if a received mail piece from a sender is incorrectly addressed. The mail piece may comprise a letter, package, post card, or any known mail piece. The sender may be any individual, or entity that sends mail pieces. The recipient may be any individual, role, department, or entity that is intended to receive or process the mail piece. If the mail piece is correctly addressed then the mail is handled through normal mail handling procedures at 211. However if the mail is incorrectly addressed then the method proceeds to 202.

For illustrative purposes, and to aid in understanding features of the invention, an example will now be introduced. This example will be carried through the detailed description and this example is not intended to limit the scope of the invention.

In the example, a vender (such as ABC vendor) may send a mail piece that contains an invoice to a company. The mail piece may comprise an envelope and the invoice may comprise a sheet of paper. The envelope may be addressed to the company but may either reference an individual who is no longer at the company or may reference an incorrectly spelled name. For example, the mail piece should be to the attention of a Mr. Robert Hanson Accounts Payable Department and because of an error, the mail piece is addressed to a Mr. Robert Larson Accounts Payable Department. In this embodiment, the company does not employ an individual named Mr. Robert Larson.

At 202, the mail piece is scanned. The mail piece may be scanned by any scanner such as scanner 101 of FIG. 1. In some embodiments, both a first side (i.e. front) of the mail piece will be scanned and a second side (i.e. back) of the mail piece will be scanned. Continuing with the above example, a company employee may insert the mail piece into a scanner and scan the mail piece or in some embodiments, the mail piece may be automatically sorted and fed into a scanner.

At 203 the scanned mail piece is analyzed to produce analysis results. The scanned mail piece may be analyzed by an expert system such as expert system 104 of FIG. 1.

In some embodiments, the analysis may comprise determining a plurality of envelope characteristics at 203*a*, and storing the plurality of envelope characteristics in a database at 203*b*. The plurality of envelope characteristics may be associated with the sender. Envelope characteristics may comprise, but are not limited to, at least one of a postage meter number, a return address, or an address change service ("ACS") participant code with optional ACS key line. In another embodiment, the plurality of envelope characteristics may comprise, but are not limited to, at least one of a return address font, a return address color, a return address size, an envelope color, an envelope background, an envelope texture, an address font, an address size, an address color, or a flap design.

The analysis may further comprise analyzing internal content of the mail piece to determine a plurality of content characteristics such as, but not limited to, at least one of a detection of MICR, and a determination of a subject matter based on a portion of scanned content text. For example, a light associated with the scanner 101 may shine through the mail piece that allows the scanner to capture data associated with the content of the mail piece.

Continuing with the above example, after the mail piece is scanned, the system may determine the content and envelope characteristics associated with the mail piece addressed to Robert Larson. For example, the system may determine that a letter to Robert Larson is from ABC vendor by scanning in the return address. The system may determine that ABC vendor uses envelopes with a specific physical texture, prints in blue ink, and has a postage meter number of 1234. Furthermore, the system may determine that the contents contain the word "Invoice".

Next, at 204 a correct address for the mail piece is determined based at least in part on the analysis results. The determining may comprise matching one or more of a plurality of envelope characteristics to one of a plurality of mail recipients and/or matching one or more of a plurality of content characteristics to one of a plurality of mail recipients. Continuing with the above example, in one embodiment, the system may automatically determine that Robert Hanson, being only 2 letters different than Robert Larson and also working in the department noted on the address, is the closest sounding name to Robert Larson and may then associate incoming mail from ABC vendor addressed to Robert Larson with Robert Hanson. In another embodiment, the system may automatically determine that all invoices, such as the invoice contained within the mail piece, should be sent to an accounts payable department and may associate the mail piece and any future incoming mail from ABC vendor addressed to Robert Larson with the accounts payable department. In another embodiment, the system may automatically determine from an account database that Robert Hanson handles the ABC vendor account. In yet another embodiment, a worker may determine that Robert Hanson handles an account associated with ABC vendor and may enter the association into the system so that all future mail from ABC vendor for Robert Larson goes to Robert Hanson.

A correctly addressed label is printed based on the determination at 205 and, at 206, the correctly addressed label is adhered to the mail piece. In some embodiments, instead of printing and adhering the correctly addressed label, the mail piece may be sorted directly into a recipient bin. Continuing with the example, a label with the name Robert Hanson may be printed and affixed to the mail piece.

At 207 the mail piece comprising the correctly addressed label is sent to a mail recipient. The mail recipient may be the mail recipient determined by the system to be associated with the incorrectly addressed mail piece. Continuing with the above example, the mail piece will be sent to Robert Hanson. At 208, a correct address is confirmed. For example, in some embodiments, after the mail piece is sent to the mail recipient, a mailroom clerk, such as clerk 105, may confirm that the mail piece is correctly addressed. In some embodiments, the recipient may also receive a correction notification card with the mail piece and instructions that inform the recipient to place the card in the mail if they are a correct recipient or to inform the mailroom if they are not the correct recipient. In another embodiment, the correctly addressed label may be able to be peeled off the mail piece. The peeled off label may provide an area for the recipient to check off if they are a correct recipient and the peeled off label may be returned to the mailroom for address verification.

The method 200 may further comprise transmitting a notification of the correct address to the sender at 209. By transmitting a notification of the correct address to the sender, the sender may be able to use a correct mailing address for future mailings. The transmitting may comprise creating a return mail piece, such as a notification card, where the notification card comprises the correct address (e.g. the correct internal department or individual employed by the recipient company) and an image of the incorrectly addressed mail piece. By sending an image, the sender may be able to learn which mail piece was incorrectly addressed or in some embodiments, a mailroom may determine the sender associated with the notification card based in part on the image. Without the image, the sending mailroom may not know who within the company sent the mail piece.

In some embodiments, the image of the incorrectly addressed mail piece on the notification card may be modified to prevent barcodes located on the incorrectly addressed mail piece from being displayed and this prevents the barcodes from being read by a mail service which may prevent the notification card from being properly and timely delivered to the sender. The notification cards may be sent to the sender via the mail service and the notification cards may be sent one piece at a time, or in a batch mailing with updates from all recipients.

In some embodiments, transmitting a notification of the correct address to the sender may comprise creating an electronic file that includes the correct address (e.g. the correct internal department or individual employed by the recipient company), and a digital image of the incorrectly addressed mail piece. The digital image may be a JPEG image that comprises the digital image of the notification card and the correct address. The electronic file may be sent to the sender via email. In some embodiments, the email address may be associated with a meter number. For example, a meter number printed on a postage portion or postage indicia of the mail piece may be associated with an email address that is stored with a postage meter vendor. The notification file may be sent to the meter vendor and the meter vendor may forward the notification file to the associated email address of the meter number. In addition, notification files may be sent electronically (single or batch) through the USPS if the mailer has a participant code on the envelope. However, this may require participation and agreement of the USPS.

In some embodiments, the notification file may include a link to a web site where the notification file data may be examined and downloaded. In another embodiment, Information-Based Indicia ("IBI") may include an email address.

Figure 3:
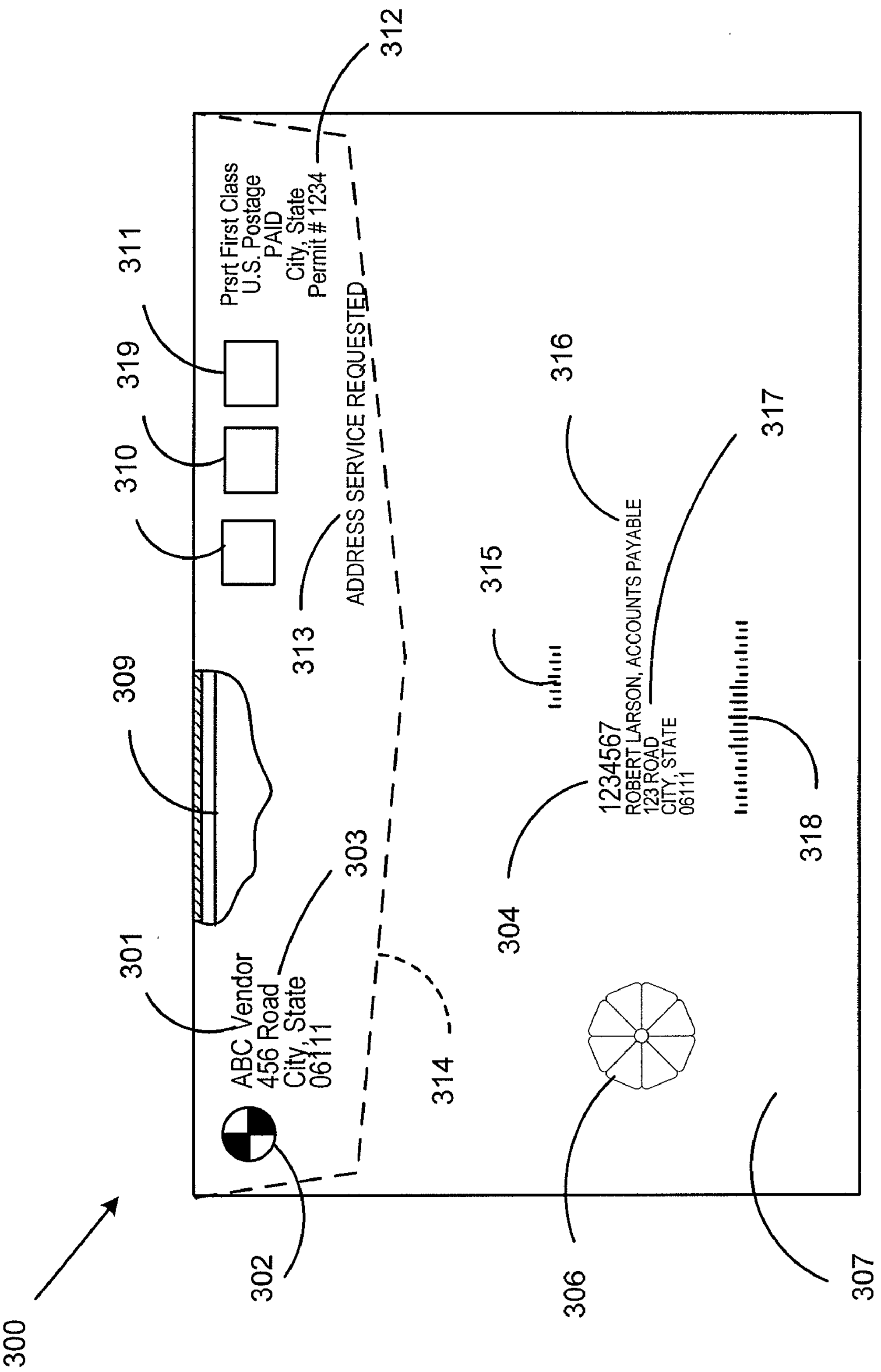
FIG. 3 illustrates an envelope according to some embodiments.

FIG. 3 illustrates a plurality of envelope characteristics according to some embodiments. An envelope 300 may comprise some of a plurality of identifiable characteristics such as, for example, a sender's name 301; a sender's graphic(s) where the graphics have a specific font, color or spacing 302; a return address where the return address may have a specific font, color or spacing 303; a tracking code 304, i.e., address change service (ACS) participant code with an optional ACS keyline; an envelope graphic(s) 306; an envelope color, background design and/or envelope texture 307; contents 309; an advertisement 310; a date 311; a meter or permit number 312; an endorsement 313; a flap having a shape 314; a planet code 315; an addressee 316; and address 317 containing an address font, color, and/or size; one or more barcodes 318; and an IBI 319. Each of the aforementioned envelope characteristics may be detected by a scanning mechanism such as the scanner 101 of FIG. 1.

Figure 4:
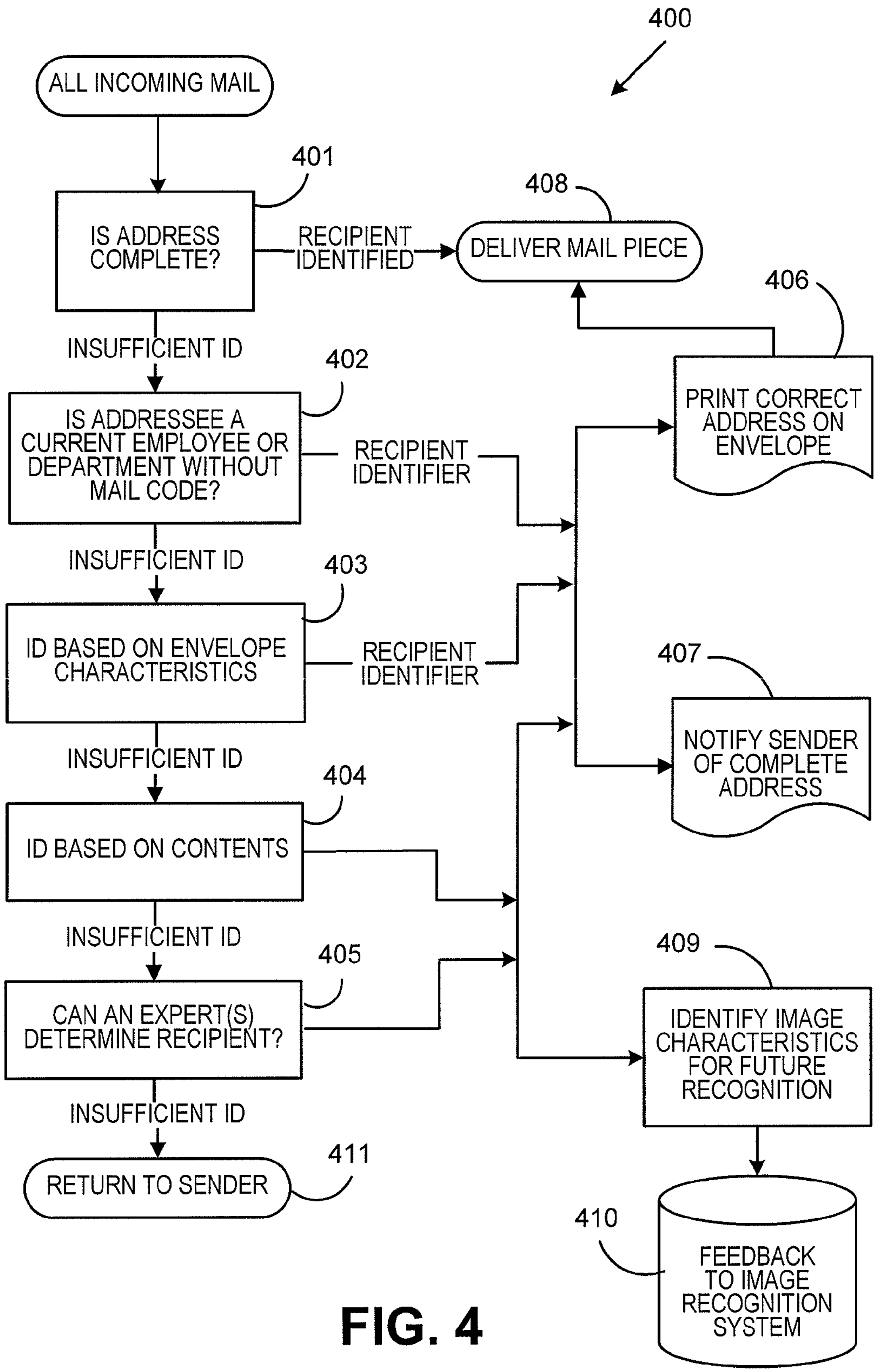
FIG. 4 illustrates a method according to some embodiments.

Now referring to FIG. 4, a method 400 is illustrated according to some embodiments. At 401*a* determination is made if an address of a mail piece is complete (i.e. addressed to a known individual) and if the address is complete then the mail is delivered to a mail recipient at 408. However, if the address of the mail piece is not complete then, at 402, the address is analyzed. In some cases, the stated address may contain the name of an individual or a department, but lacks the correct mail routing code. If the correct mail routing code can be determined through analyzing the existing address information then a corrected address may be printed on the envelope at 406 and a sender may be notified of the corrected address at 407. If a correct address is not determined (i.e. more data is needed) then the method proceeds to 403.

At 403, an identification of the addressee may be determined by one or more envelope characteristics such as those described with respect to FIG. 3. If a determination can be made based on the envelope characteristics alone or in combination with the existing address information then a corrected address may be printed on the envelope at 406 and a sender may be notified of the correct address at 407. However, if the envelope characteristics do not provide enough data to determine a correct recipient, then at 404 the envelope is opened and the contents are scanned, converted to text using optical character recognition (OCR). An identification of the addressee may be determined by analyzing the contents of the mail piece. Examples may include, but are not limited to, key phrases such as "accounts payable", a recipient name printed on an enclosed letter ("Attn: Human Resources", or "Dear Mr. Hanson"), or the inclusion of a check (for accounts receivable).

If the contents of the mail piece provide identification, the pertinent envelope characteristics may be identified at 409 to facilitate future identification without the need to open the envelope. These characteristics are then fed back to a database at 410 such as the expert system 104 of FIG. 1 for future image characteristics recognition. If the correct address can be determined then a corrected address may be printed on the envelope at 406 and a sender may be notified of the corrected address at 407.

However, if the contents do not provide enough information, then the mail piece may be sent to a clerk, such as clerk 105, to manually determine whom the mail piece should be addressed to. If the clerk 105 determines the correct address then the pertinent envelope or content characteristics information may be manually added to the database and at 410 fed back to an image recognition system such as the expert system 104 of FIG. 1 for future image characteristics recognition. A corrected address may be printed on the envelope at 406 and a sender may be notified of the corrected address at 407. If the clerk cannot determine a correct recipient, then the mail piece may be returned to the sender at 411.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method of determining a correct mail recipient comprising:

determining that a mail piece received from a sender is incorrectly addressed;

scanning, by a scanning device, the mail piece;

determining, by a processing device, a plurality of envelope characteristics associated with the sender, the plurality of envelope characteristics comprising at least one of a meter number, a return address, an address change service participant code or an address change service key line;

analyzing, by the processing device, the scanned mail piece to produce analysis results based at least in part on the plurality of envelope characteristics;

determining, by the processing device, a sender of the mail piece based at least in part on the analysis results;

determining, by the processing device, a correct address for the mail piece based on the sender and at least in part on the analysis results by matching one or more of the plurality of envelope characteristics to one of a plurality of mail recipients;

placing the correct address on the mail piece; and sending the mail piece to the correct address.

2. The method of claim 1, further comprising:

transmitting a notification of the correct address to the sender.

3. The method of claim 2, wherein transmitting a notification of the correct address to the sender comprises:

creating a return mail piece comprising the correct address, and an image of the incorrectly addressed mail piece; and sending the return mail piece to the sender via a mail service.

4. The method of claim 3, wherein the image of the incorrectly addressed mail piece is modified to prevent barcodes located on the incorrectly addressed mail piece from being displayed.

5. The method of claim 2, wherein transmitting a notification of the correct address to the sender comprises:

creating an electronic file comprising the correct address, and a digital image of the incorrectly addressed mail piece; and sending the electronic file to the sender via email.

6. The method of claim 5, wherein the email is sent to an email address that is associated with a meter number.

7. The method of claim 1, further comprising:

storing the plurality of envelope characteristics in a database.

8. The method of claim 1, wherein the plurality of envelope characteristics comprises at least one of a return address font, a return address color, a return address size, an envelope color, an envelope background, an envelope texture, an address font, an address size, an address color, or a flap design.

9. The method of claim 1, further comprising:

opening the mail piece; and manually scanning the contents of the mail piece.

10. A system comprising:

a scanner for scanning a received incorrectly addressed mail piece;

a database for storing a plurality of characteristics associated with the mail piece, the plurality of characteristics comprising at least one of a meter number, a return address, an address change service participant code, or an address change service key line;

a label printer for printing a label comprising a correct address associated with the mail piece; and a processor adapted to:

analyze data received from the scanner to produce analysis results wherein the analysis results include a plurality of envelope characteristics; determine a sender for the mail piece based at least in part on the analysis results and information from the database;

determine a correct address for the mail piece based at least in part on the sender, the analysis results, and information from the database by matching one or more of a plurality of envelope characteristics to one of a plurality of mail recipients; and control the label printer to print a correctly addressed label based on the determined correct address;

wherein the correctly addressed label can be adhered to the mail piece and the mail piece is sent to the determined correct address.

11. The system of claim 10, wherein the plurality of envelope characteristics comprises at least one of a return address font, a return address color, a return address size, an envelope color, an envelope background, an envelope texture, an address font, an address size, and address color, or a flap design.

12. The system of claim 10, wherein the processor analyzes the mail piece by determining a plurality of content characteristics and storing the plurality of content characteristics in a database.

13. The system of claim 10, wherein a notification of the correct address is transmitted to the sender.

* * * * *